United States Patent

Areso

[11] Patent Number: 5,816,490
[45] Date of Patent: Oct. 6, 1998

[54] THERMOSTATIC GAS VALVE FOR DOMESTIC HEATERS

[75] Inventor: Jon Ganzabal Areso, Aretxabaleta, Spain

[73] Assignee: Fagor, S. Coop., Mondragon, Spain

[21] Appl. No.: 857,215

[22] Filed: May 15, 1997

[30] Foreign Application Priority Data

Jul. 31, 1996 [ES] Spain ................................. 9601716

[51] Int. Cl.⁶ ............................. F23N 1/00; G05D 15/00
[52] U.S. Cl. ...................... 236/15 A; 236/68 D; 431/80
[58] Field of Search ............................. 236/15 A, 68 D; 431/80

[56] References Cited

U.S. PATENT DOCUMENTS

| | | |
|---|---|---|
| 3,861,586 | 1/1975 | Katchka ................................. 236/15 A |
| 4,640,676 | 2/1987 | Katchka et al. ..................... 236/38 D |
| 5,407,128 | 4/1995 | Schultz ................................. 236/15 A |

*Primary Examiner*—William E. Wayner
*Attorney, Agent, or Firm*—The Kline Law Firm

[57] ABSTRACT

The thermostatic gas valve comprises a body (2) wherein three cylindrical cavities of parallel axes (8,9,10) contain the flow valves (6,20,13,14) and a thermostatic bellows (11), a single rotating knob (7) having a cap (7a) and an inner cylindrical member (7b) with relative axial movement, and four chambers (30,31,32,33) communicating a respective valve with the two pairs of gas inlets (34,34') and outlets (35,35') located for access thereto from the front of the valve. The guide means (23,40) for the central shaft (8') of the knob (7) are combined with the guide means (15a,15b, 15c,41) for the body cover (15) located underneath the knob (7), to find its different angular positions. The obturators of the minimum and proportional gas flows are formed in a single piece by two integral parts.

4 Claims, 3 Drawing Sheets

_5,816,490_

THERMOSTATIC GAS VALVE FOR DOMESTIC HEATERS

FIELD OF THE INVENTION

The present invention relates to a gas fuel valve for domestic stoves and water heaters, structured with various gas passage chambers, which, in addition to the mechanisms for operating the rotary valve manually with a operating rotary knob, comprises a valve regulating the gas flow by means of the operation of a thermostatic device sensitive to room or water temperature.

PRIOR ART

GB-1 395 774 describes a thermostatic gas valve incorporating a body cover underneath the knob, which cover is provided with means for guiding the operating shaft to find the different angular positions of the said shaft.

FR-2064282 describes a water valve whose operating knob comprises a rotating, axially movable cap and a rotating inner member, to actuate a valve and the gas flow-setting device, respectively, with the cooperation of a gear ring enmeshing with another gear ring on the setting shaft.

FR-1461179 describes a thermostatic gas valve wherein the setting shaft and the thermostatic valve are housed in parallel cylindrical cavities related through a lever that graduates the operation of the snap acting valve, and the valve body has a number of inner chambers communicating the gas flow between the said cylindrical cavities and the gas inlet and outlet.

SUMMARY OF THE INVENTION

The object of the invention is a thermostatic gas valve for water and room heaters provided with a safety valve with an electromagnet for the firing of the burner, an interlock device to prevent the knob from rotating and to prevent the manual rotary valve distributing the gas flow from opening before firing, and two valves in series for thermostatic regulation, one of which valves provides the minimum heating gas flow and the other adds to the first flow a gas flow proportional to the temperature of the medium. Both regulating valves are actuated by a lever from a thermostatic bellows that is set by means of a shaft separate from the single control knob, which shaft, having the three functions of arming the safety valve, actuating the manual distributing valve and setting the thermostatic bellows, can be moved axially and rotate a given angle to find one of various angular operating positions on the central shaft of the control knob.

The thermostatic gas valve in accordance with the invention is defined in the claims. It pursues the result of a single, easily worked control whose operating shaft is positioned securely within the angle to which it is turned, and also the objective of reducing the volume of the valve body and simplifying it for molding. The valve is provided with two gas inlets and two gas outlets, all of which are oriented for front access at any of the positions in which the valve may be fixed to the device. The distribution of the inner communicating chambers with respect to the said pairs of inlets and outlets allows the use of one such inlet or outlet without the need of perforating the other as well, as occurs with the prior art valves, because both communicate with their corresponding chambers from the time the valve body leaves the casting mold. The reduction of valve size is possible due to the construction of the gas flow regulating valves, the minimum valve and the proportional valve, which features a single two-part obturator driven by the lever of the thermostatic bellows.

PREFERRED EMBODIMENT OF THE INVENTION

Figure 2:
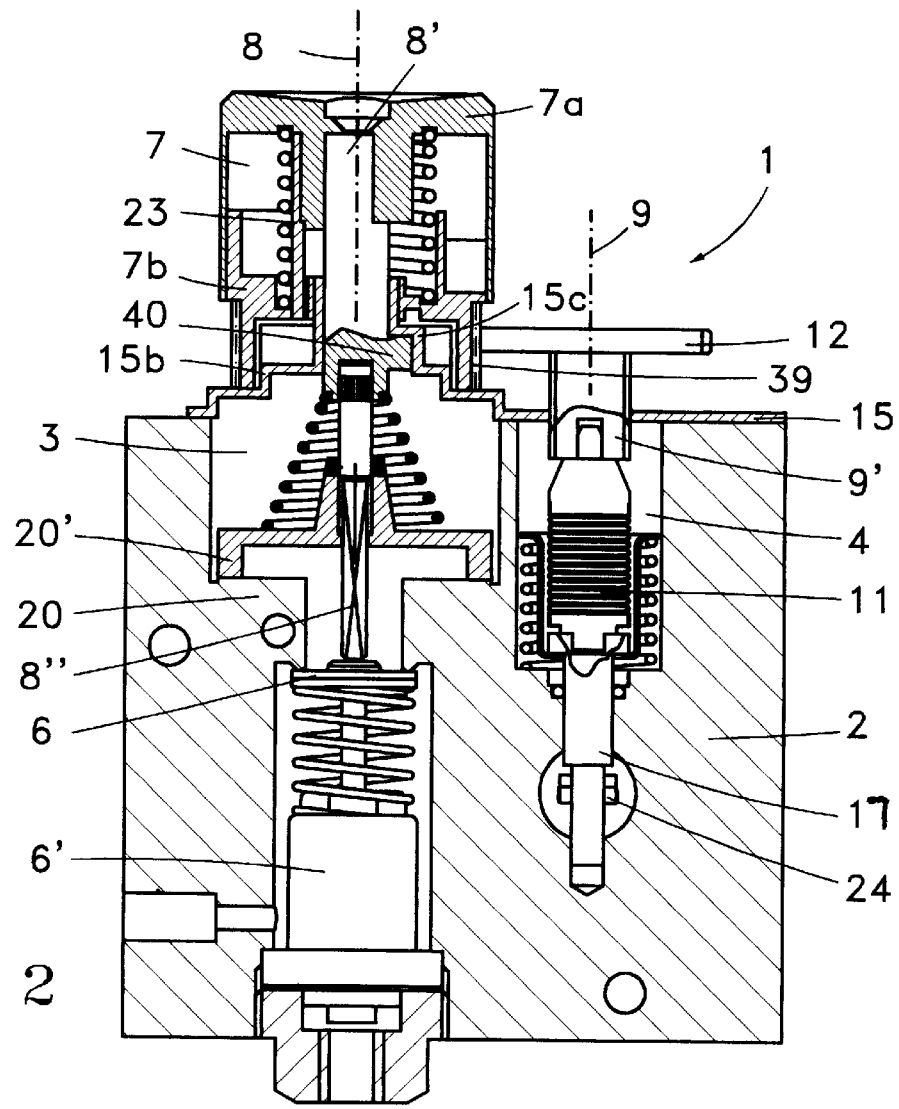
FIG. 2 is a view of a section of the valve that is the object of the invention along II—II in FIG. 1.
Figure 1:
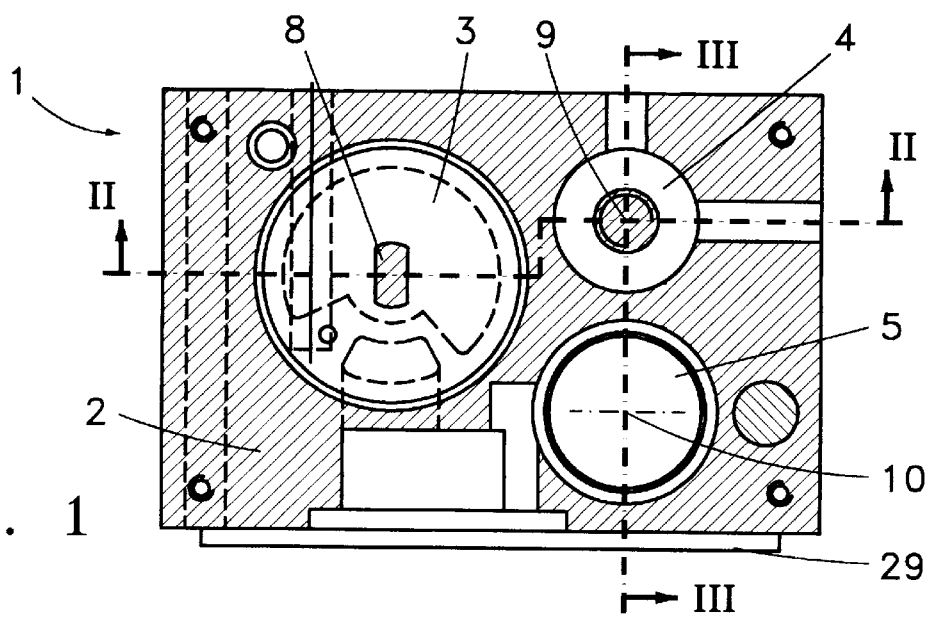
FIG. 1 is a plan view of the thermostatic valve that is the object of the invention sectioned along an intermediate plane perpendicular to the operating and setting shafts.
Figure 5:
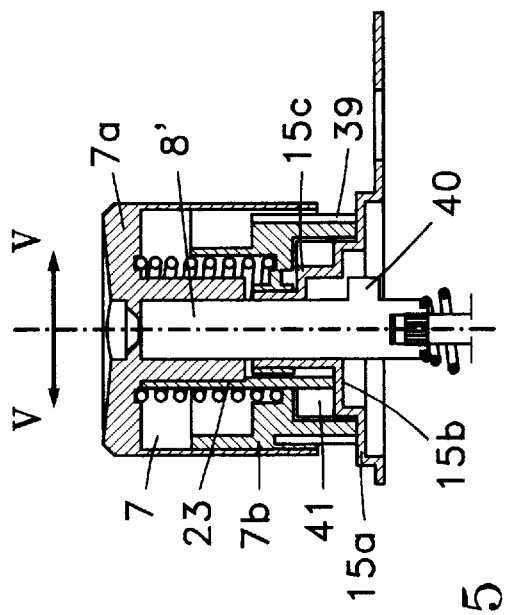
FIG. 5 is a section of the valve cover along V—V in FIG. 4.
Figure 4:
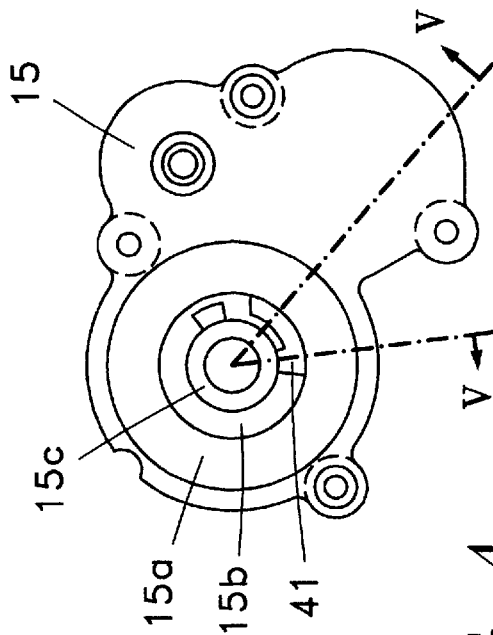
FIG. 4 is a plan view of the valve cover in the above figures.
Figure 7:
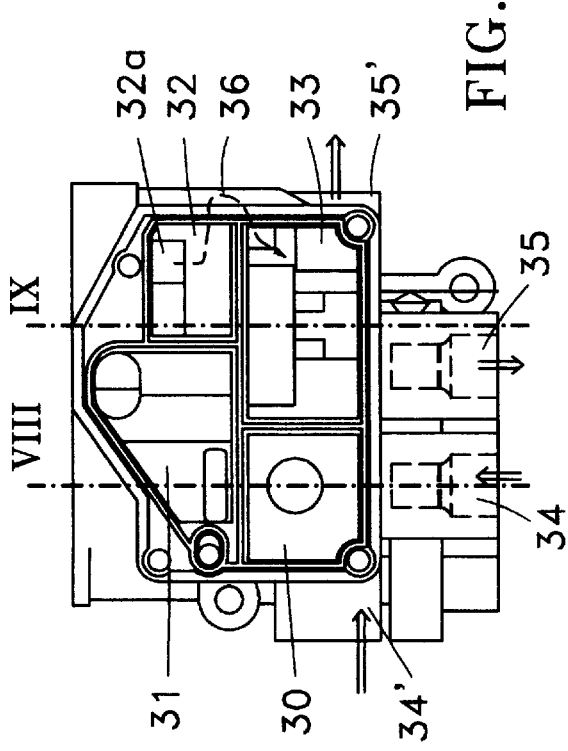
FIG. 7 is an elevational view of the valve body in FIG. 6.
Figure 6:
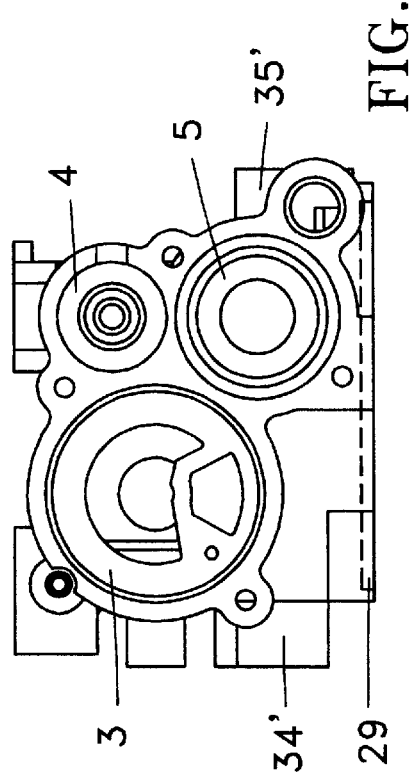
FIG. 6 is a plan view of the valve body in FIGS. 1 to 3.

With reference to FIGS. 1 to 9 showing a preferred embodiment of the thermostatic gas valve that is the object of the invention, thermostatic valve 1 comprises a knob 7 with a shaft 8, shown in FIGS. 2 and 5, the one-piece body 2 molded of aluminum, shown in FIG. 1 and FIGS. 6–9, the valve cover 15 covering the top face of the body, shown in FIGS. 4 and 5, and the plate 29 for sealing the front face of the body 2, shown in FIG. 1 and FIGS. 6–7.

On the inside of the body 2 are formed three cylindrical axial cavities 3,4,5 having respective axes 8,9,10 for housing the different gas flow valves and the thermostatic regulation device, and four chambers 30,31,32,33 having a rectangular section transverse to the said axes. The cavity 3 has the largest diameter, as shown in FIGS. 1 and 2, contains a safety valve 6 embodied with an electromagnet 6', and a manual rotary valve 20 of the distributing disc 20' type, on which valves is superposed the operating knob 7; cavity 4, that of the smallest diameter, shown in FIGS. 1–3, contains the thermostatic element 11 of the temperature-sensitive bellows type and the thermostatic actuating stem 17, on which is superposed the outer gear ring 12. The cavity 5 of an intermediate diameter, shown in FIGS. 1 and 3, contains in series the minimum flow valve 13 plus the thermostatic proportional valve 14, which are both actuated by the lever 24 coupled to the bellows 11 through the stem 17.

Figure 8:
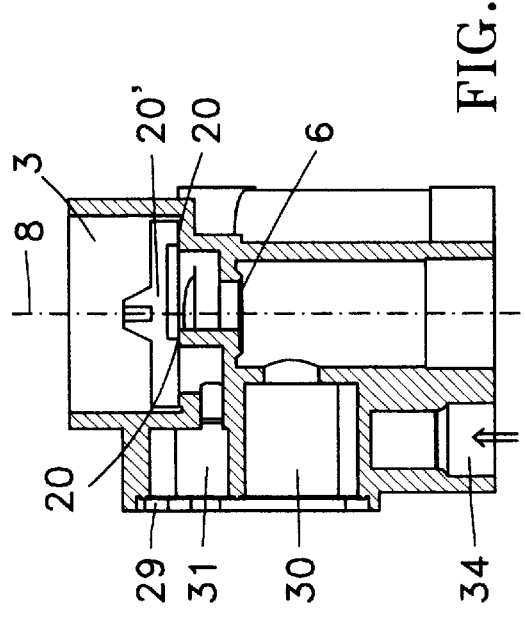
FIG. 8 is a sectioned side view of the valve body along VIII in FIG. 7.
Figure 9:
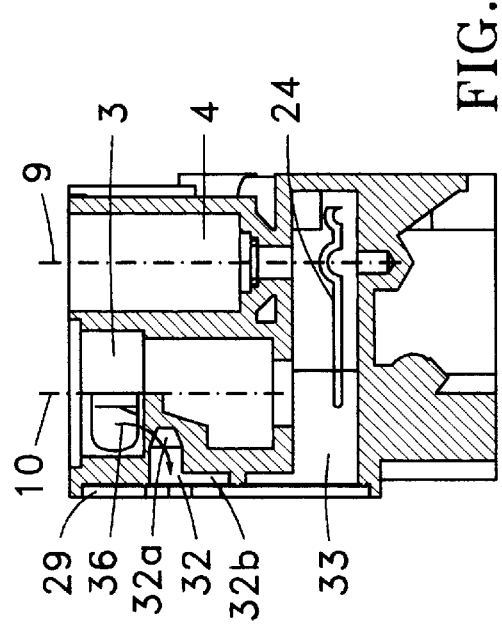
FIG. 9 is a sectioned side view of the valve body along IX in FIG. 7.

The body 2 also forms in its interior, as shown in FIGS. 6–9, four communicating chambers 30,31,32,33 forward of the position of the sealing plate 29, which chambers form a gas passage circuit between the two inlets 34,34' and the two outlets 35,35', depending on the angular position of the operating knob 7. The said chambers are distributed by pairs in two levels along the direction of the axes 8,9,10, which chambers are named the gas intake chamber 30 to intake gas from the safety valve 6, and on/off distributing chamber 31 which the gas flow enters from rotary distributing valve 20, both of which chambers are shown in FIGS. 2, 7 and 8, chamber 32 that conveys the thermostatically regulated gas flow 36 of the main heater burner or maximum gas flow, according to the arrow in FIGS. 3, 7 and 9 entering from on/off distributing chamber 31, outgoing chamber 33 which communicates with chamber 32 for the outlet of the two partial gas flows in approximately equal shares, the minimum flow being 36a and the proportional flow being 36b, which gas flows, as shown in FIG. 3, are shunted respectively toward the annular chamber part 32a and toward the chamber part 32b, in this latter case when the valve regime is thermostatic and valve 14 is opened in proportion with the difference between the real temperature value and the value achieved.

The embodiment 1 of the valve, shown in FIG. 7, has two gas inlets 34 and 34' and two gas outlets 35 and 35', one of each located laterally in planes opposite the body 2, and the other two 34,35 in a pair in the plane opposite that of the operating knob 7, each pair of equal passages communicating respectively with the forward inlet chamber 30 and the forward outlet chamber 33. The two pairs of inlets and outlets are constructed blind from the time they are molded and are subsequently perforated to create the said communication with the respective chamber.

The operating knob 7, as shown in FIGS. 2 and 5, comprises a cap 7a and an inner cylindrical member 7b that is also rotary, the cap 7a is provided with an operating shaft 8' of which it is a part and an eccentric safety feeler rod 23 of which it is also a part, and the inner member 7b rests on the cover 15 of the body and is covered partially by the cap 7a leaving visible a geared cylindrical surface 39 that enmeshes with the gear ring 12 of the axle 9' for setting the bellows 11. The cap 7a also moves axially to open the safety valve 6 by means of the push rod 8''', which is a prolongation of the shaft 8'. The rotation of the knob 7 when it is in the "at rest" condition, as shown in FIG. 2, finds the angular positions corresponding to the different valve regimes, not shown in the drawings, and whose different rotation stops are established by means of the stub 40 of the shaft 8' and the peripheral steps 15b and 15c of the valve cover 15, which are superposed on the first and lower step 15a upon which rests the inner member 7b. The axial movement of the cap 7a is only possible when its angular position is such that the safety feeler rod 23 is superposed upon a recess 41 cut into the step 15c, as shown in FIGS. 4 and 5. Thus, an interlock device cooperating also, the knob 7 cannot be turned until the electromagnet 6' has been activated, and in this position only the pilot gas flow passage is open. For setting the thermostatic bellows 11, the threaded setting shaft 9' advances axially with the rotation of the gear ring 12, which enmeshes with the setting member 7b only in a condition of null movement of the cap 7a, when the stub 40 rests underneath the step 15c of the cover in the "at rest" condition of the knob 7 shown in FIG. 1, but with the feeler rod 23 outside the recess 41. To open the rotary disk-type distributing valve 20, the knob 7 is set in its middle movement, not shown in the drawings, with the stub 40 of the shaft 8' underneath the middle step 15b of the cover.

Figure 3:
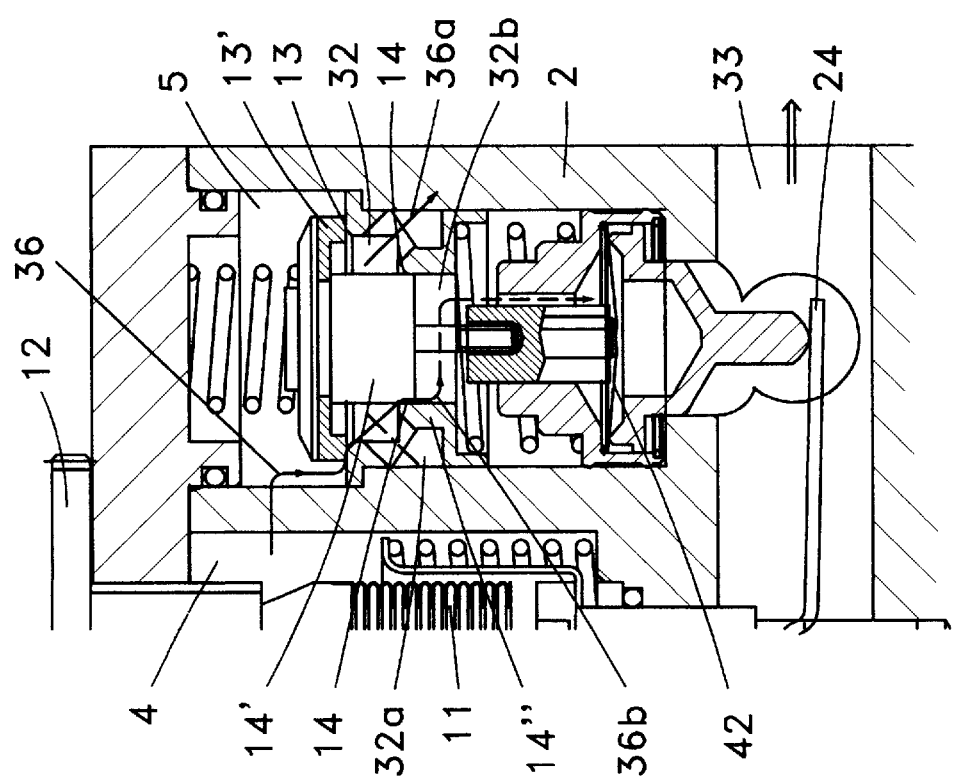
FIG. 3 is a partial view of a section of the valve along III—III in FIG. 1.

The cavity 5 of the body contains the valves 13 and 14 for thermostatic regulation and the mechanism for actuating the said valves by means of the lever 24 of the thermostatic bellows 11 housed in the outlet chamber 33 that crosses cylindrical cavities 4 and 5, as shown in FIG. 3. The two valves are arranged in series in the direction of the axis 10 of the cavity, and are driven by the same thermostatic mechanism from the lever 24 depending on the temperature value reached. The valves regulating the gas flow 36 are a snap acting valve 13 with a transversal seat for the minimum gas flow 36a and a valve 14 that gradually moves axially, both of which valves have the same obturator of two integral parts 13' and 14'. The valve 13 for the minimum gas flow 36a is made with a disk that opens or closes the passage by the snap of the snap acting device 42 wherein it is moved axially from its seat 13, and the proportional valve 14 is made with a cylinder 14' housed in a cylindrical bushing 14''' wherein it is gradually driven by the same snap device 42 after the opening of the valve 13. Initially, for firing, the valve 13 is closed, and during the regulating regime it is opened to allow the regulating gas flow 36 to pass, the minimum gas flow 36a passing first through the chamber 32a and subsequently, in proportion to the movement of the obturator cylinder 14' of the proportional valve 14, this minimum flow is increased by the proportional gas flow 36b, which passes through the chamber 32b. The seat of the proportional valve 14 is the inner surface of the cylindrical space of the bushing 14'', wherein it is the interposed surface that determines the flow 36b of gas that circulates, by means of the axial movement of the obturator 14'.

I claim:

1. A thermostatic gas valve for water and room heaters, comprising:

a molded aluminum body having three separate cylindrical cavities whose axes lie parallel to one another;

at least one gas inlet and one gas outlet in the valve body;

a thermoelectric safety valve and a rotary valve for the distribution of the main-flow gas from the inlet, both valves being coaxial and housed in the first of the three cylindrical cavities, the safety valve opening by means of the axial thrust of an operating knob whose shaft is coaxial with the first cylindrical cavity, and the rotary valve for distribution opening by means of the rotation of the same operating knob;

a thermostatic bellows provided with a coaxial bellows-setting shaft and a bellows-actuating rod, both housed in the second of the three cylindrical cavities;

at least one regulating valve housed in the third of the three cylindrical cavities for the thermostatic regulation of the gas flow from the distributing valve, and actuated by the said bellows-actuating rod;

a number of internal communicating chambers in the body communicating the cylindrical cavities between the gas inlets and outlets;

a plate for sealing the internal communicating chambers from the exterior of the valve body;

a valve cover set underneath the operating knob, covering the cylindrical cavities on the front face of the valve body, and provided with guide means for axial movement and for the rotation of the operating knob;

said operating knob having a rotary and axially movable cap, an inner cylindrical member covered by the cap and rotating with the cap for turning the bellows-setting shaft, a central shaft integral with the cap provided with a transverse stub, for guiding, in cooperation with the cover guide means, the rotation of the knob up to different operating angular positions, and an eccentric feeler rod that is also integral with the cap, for guiding the axial movement of the knob.

2. Thermostatic valve according to claim 1, wherein the guide means in the valve cover are drawn surfaces of different diameters and stepped heights with respect to the front face of the valve body.

3. Thermostatic valve for water and room heaters, comprising:

a molded aluminum body having three separate cylindrical cavities whose axes lie parallel to one another;

a pair of separated gas inlets and a pair of separated gas outlets in the valve body, one of each being accessible for outside connection from a different side of the valve body;

a thermoelectric safety valve and a rotary valve for the distribution of gas from the inlet, both valves being coaxial and housed in the first of the three cylindrical cavities;

a thermostatic bellows provided with a coaxial bellows-setting shaft and a bellows-actuating rod, both housed in the second of the three cylindrical cavities;

a regulating valve housed in the third of the three cylindrical cavities for the regulation of the gas flow coming from the distributing valve, having a snap acting type minimum gas flow valve and a thermostatic proportional valve, both valves being connected in series and actuated one after the other by the said bellows-actuating rod;

an operating knob having a rotary and axially movable cap, an inner cylindrical member covered by the cap and rotating with the cap for turning the bellows-setting shaft, a central shaft integral with the cap provided with a transverse stub for guiding, in cooperation with the cover guide means, the rotation of the knob up to different operating angular positions;

a valve cover set underneath the operating knob, covering the cylindrical cavities on the front face of the valve body, and provided with guide means for the axial movement and for the rotation of the operating knob;

a plurality of internal communicating chambers in the valve body communicating the cylindrical cavities between the gas inlets and outlets, comprising at least one gas inlet chamber, one gas outlet chamber, one distributing chamber connected to the rotary distributing valve, and one regulating chamber connected to the regulating valve conveying the gas to the outlet chamber;

a plate for the sealing of the internal communicating chambers from the exterior of the valve body.

4. The thermostatic valve according to claim 3, wherein the minimum gas flow valve and the thermostatic proportional flow valve for the regulation of the gas flow, are constructed with a single obturator formed of two integral parts, and each of the said gas flows leads to the outlet chamber through a respective partial regulating chamber.

* * * * *